(12) United States Patent
Guest et al.

(10) Patent No.: US 9,137,172 B2
(45) Date of Patent: Sep. 15, 2015

(54) MANAGING MULTIPLE PROXY SERVERS IN A MULTI-TENANT APPLICATION SYSTEM ENVIRONMENT

(71) Applicant: salesforce.com, inc., San Francisco, CA (US)

(72) Inventors: Ryan Guest, Stockton, CA (US); Steven Lawrance, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 347 days.

(21) Appl. No.: 13/854,492

(22) Filed: Apr. 1, 2013

(65) Prior Publication Data

US 2013/0297801 A1 Nov. 7, 2013

Related U.S. Application Data

(60) Provisional application No. 61/641,404, filed on May 2, 2012.

(51) Int. Cl.
G06F 15/173 (2006.01)
H04L 12/911 (2013.01)
G06F 17/30 (2006.01)

(52) U.S. Cl.
CPC .......... H04L 47/827 (2013.01); G06F 17/3089 (2013.01)

(58) Field of Classification Search
CPC . H05K 999/00; G06F 9/45533; G06F 11/079; H04L 67/10; H04L 41/04
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,094,660 A * | 7/2000 | Glitho ................. 1/1 |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |

(Continued)

*Primary Examiner* — Peling Shaw
(74) *Attorney, Agent, or Firm* — Ingrassia Fisher & Lorenz, P.C.

(57) ABSTRACT

A system and method for managing a plurality of proxy servers in a multi-tenant database system is provided. The method, for example, may include, but is not limited to, receiving, by a processor, a first command, generating, by the processor, a second command for each of the plurality of proxy servers based upon the first command, and transmitting each of the generated second commands to the respective proxy server.

20 Claims, 6 Drawing Sheets

(56) References Cited

U.S. PATENT DOCUMENTS

| | | |
|---|---|---|
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,148 B1 * | 8/2003 | Salo et al. .................. 709/217 |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,695,079 B1 * | 4/2014 | Miller et al. .................. 726/10 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0209503 A1 * | 8/2008 | Hess et al. .................. 726/1 |
| 2009/0063415 A1 | 3/2009 | Chatfield et al. |
| 2009/0177761 A1 * | 7/2009 | Meyer et al. .................. 709/219 |
| 2010/0049570 A1 * | 2/2010 | Li et al. .................. 705/8 |
| 2011/0231247 A1 * | 9/2011 | Srinivasan et al. .......... 705/14.43 |
| 2012/0179646 A1 * | 7/2012 | Hinton et al. .................. 707/607 |
| 2012/0266231 A1 * | 10/2012 | Spiers et al. .................. 726/12 |
| 2013/0246528 A1 * | 9/2013 | Ogura .................. 709/204 |

\* cited by examiner

MANAGING MULTIPLE PROXY SERVERS IN A MULTI-TENANT APPLICATION SYSTEM ENVIRONMENT

CROSS-REFERENCE TO RELATED APPLICATION(S)

This application claims the benefit of U.S. provisional patent application Ser. No. 61/641,404, filed May 2, 2012, the entire content of which is incorporated by reference herein.

TECHNICAL FIELD

The following relates to data processing systems and processes, and more particularly relates to systems and processes for managing proxy servers in a multi-tenant database system environment.

BACKGROUND

Modern software development is evolving away from the client-server model toward "cloud"-based processing systems that provide access to data and services via the Internet or other networks. In contrast to prior systems that hosted networked applications on dedicated server hardware, the cloud computing model allows applications to be provided over the network "as a service" supplied by an infrastructure provider. The infrastructure provider typically encapsulates the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Although multi-tenant platforms can provide substantial benefits, they can be relatively difficult to design and develop. The often competing demands of integration and isolation between tenants, for example, can lead to any number of challenges in design and implementation. Furthermore, multi-tenant platforms often utilize many proxy servers to reduce the strain on application servers. However, managing the proxy servers can be difficult and time consuming.

DESCRIPTION OF THE DRAWING FIGURES

Exemplary embodiments will hereinafter be described in conjunction with the following drawing figures, wherein like numerals denote like elements, and FIG. 1 is a block diagram of an exemplary multi-tenant data processing system;

DETAILED DESCRIPTION

According to various exemplary embodiments, systems and methods are provided to allow a user to simultaneously manage multiple proxy servers in a system, such as a multi-tenant application system. In one embodiment, for example, a proxy management interface is provided by an application server in the multi-tenant application system. The application server, through the proxy management interface, is configured to receive a single command for all of the proxy servers in the multi-tenant application system, to generate a command for each of the proxy servers in the multi-tenant application system, and to transmit the generated commands to the respective proxy servers contemporaneously such that the generated commands are processed by the proxy servers at the same time.

Figure 1:
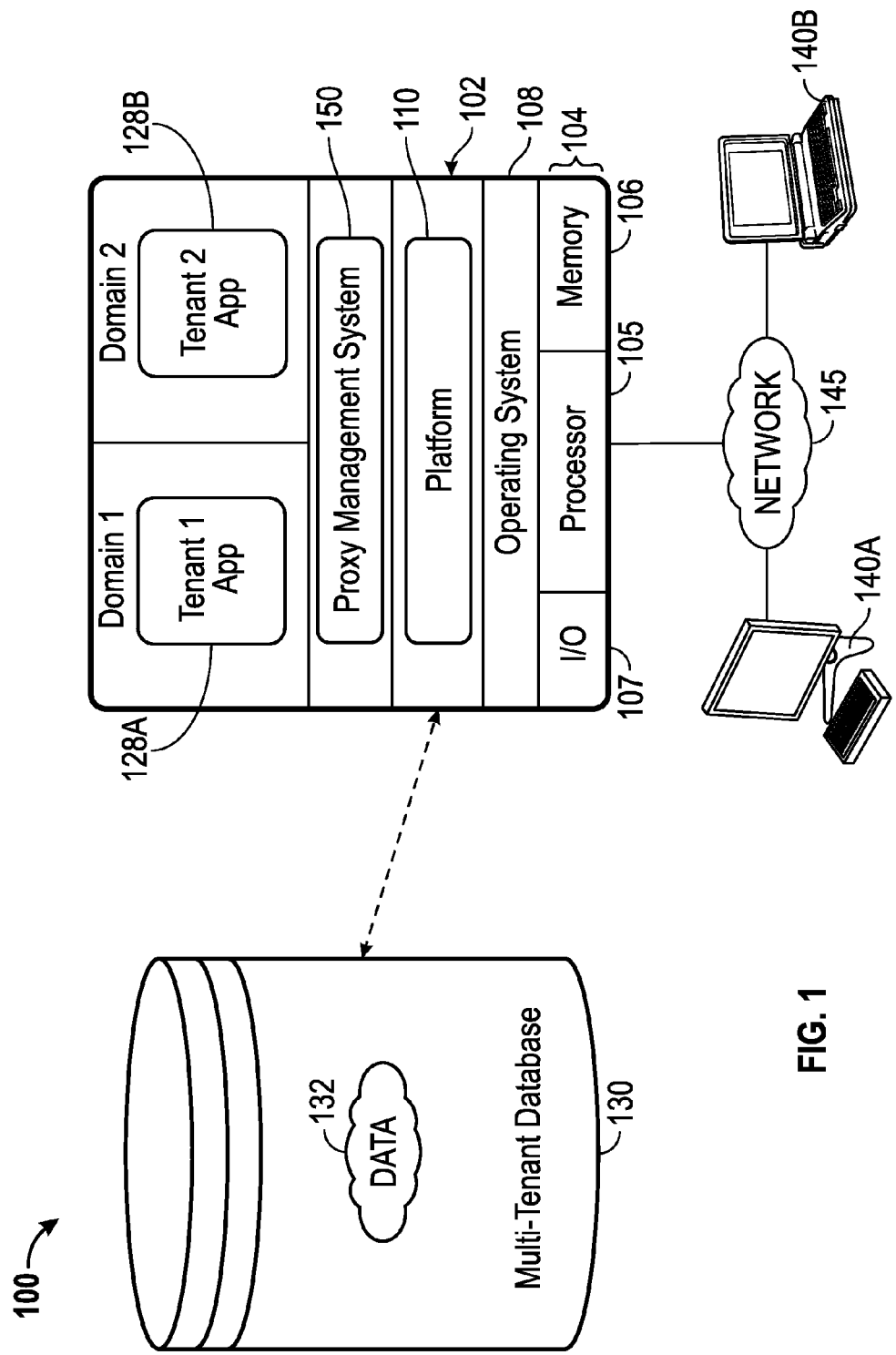

Turning now to FIG. 1, an exemplary multi-tenant application system 100 suitably includes a server 102 (which may also be referred to as an application server) that dynamically creates virtual applications 128A-B based upon data 132 from a common database 130 that is shared between multiple tenants. Data and services generated by the virtual applications 128A-B are provided via network 145 to any number of client devices 140A-B, as desired. Each virtual application 128A-B is suitably generated at run-time using a common platform 110 that securely provides access to data 132 in database 130 for each of the various tenants subscribing to system 100. Each virtual application 128A-B may be accessible via a unique domain. For example, the virtual application 128A may be accessible on a first domain (e.g., http://www.companyname1.salesforce.com) and the application 128B may be accessible on a second domain (e.g., http://www.companyname2.com).

A "tenant" generally refers to a group of users that shares access to common data within database 130. Tenants may represent customers, customer departments, business or legal organizations, and/or any other entities that maintain data for particular sets of users within system 100. Although multiple tenants may share access to a common server 102 and database 130, the particular data and services provided from server 102 to each tenant can be securely isolated from those provided to other tenants. The multi-tenant architecture allows different sets of users to share functionality without necessarily sharing each other's data 132.

Database 130 is any sort of repository or other data storage system capable of storing and managing data 132 associated with any number of tenants. Database 130 may be implemented using any type of conventional database server hardware. In various embodiments, database 130 shares processing hardware 104 with server 102. In other embodiments, database 130 is implemented using separate physical and/or virtual database server hardware that communicates with server 102 to perform the various functions described herein.

Server 102 is implemented using one or more actual and/or virtual computing systems that collectively provide a dynamic application platform 110 for generating virtual applications 128A-B. Server 102 operates with any sort of conventional computing hardware 104, such as any processor 105, memory 106, input/output features 107 and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, application platform 110 gains access to processing resources, communications interfaces and other features of hardware 104 using any sort of conventional or proprietary operating system 108. As noted above, server 102 may be implemented using a cluster of actual and/or virtual servers operating in conjunction with each other, typically in association with conventional network communications, cluster management, load balancing and other features as appropriate.

The server 102 may be one of many servers in the multi-tenant application system 100. Each of the servers 102 in the multi-tenant application system 100 may be connected to one or more proxy servers (not shown in FIG. 1). The proxy servers are used to reduce the strain on the servers 102 by handling certain requests. When a proxy server receives a request for a resource, the proxy server determines if the resource is current stored in a memory of the proxy server. If the resource is stored in the memory of the proxy server, the proxy server directly returns the resource to the requestor. If the resource is not stored on the proxy server, the proxy server requests the resource from one of the application servers 102. Accordingly, by at least some of the requests directly, the proxy servers reduce the strain on the application servers 102. As discussed in further detail below, the server 102 includes a proxy management system 150. The proxy management system 150 allows an administrator to manage all of the proxy servers in the multi-tenant application system 100 simultaneously.

Figure 2:
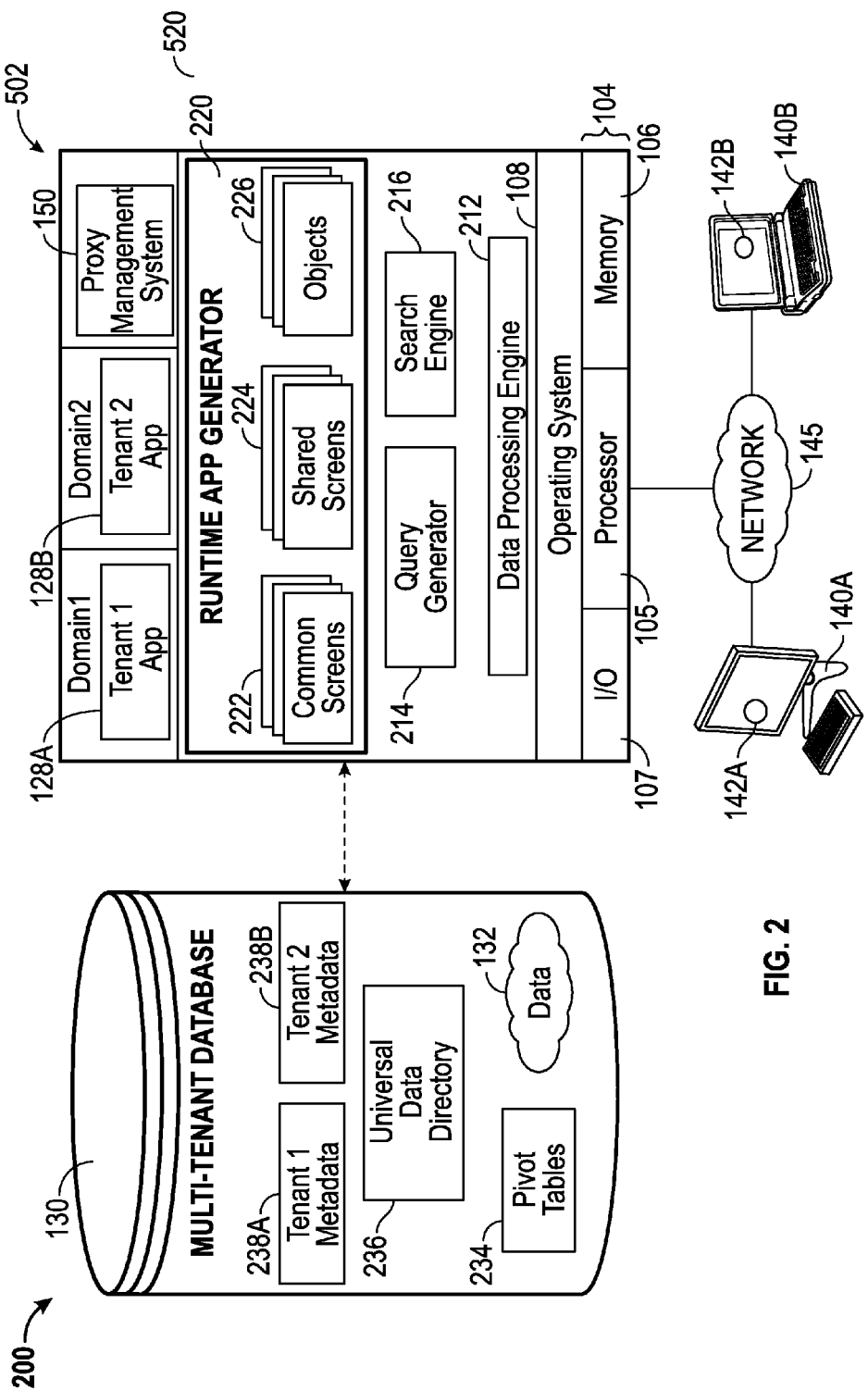
FIG. 2 is a block diagram of another exemplary multi-tenant data processing system.

FIG. 2 illustrates another exemplary multi-tenant application system 200 in accordance with an embodiment. The multi-tenant application system 200 includes client devices 140A-B and network 145 similar to those described above. The multi-tenant application system 200 further includes a server 102 that dynamically creates virtual applications 128A-B based upon data 132 from a common database 130 that is shared between multiple tenants. As discussed above, each virtual application 128A-B may be hosted on a separate domain. Further, each server has a proxy management system 150. Data and services generated by the virtual applications 128A-B are provided via network 145 to any number of client devices 140A-B, as desired. Each virtual application 128A-B is suitably generated at run-time using a common platform 110 that securely provides access to data 132 in database 130 for each of the various tenants subscribing to system 100.

Data 132 may be organized and formatted in any manner to support multi-tenant application platform 110. In various embodiments, data 132 is suitably organized into a relatively small number of large data tables to maintain a semi-amorphous "heap"-type format. Data 132 can then be organized as needed for a particular virtual application 128A-B. In various embodiments, conventional data relationships are established using any number of pivot tables or flex schema 234 that establish indexing, uniqueness, relationships between entities, and/or other aspects of conventional database organization as desired.

Further data manipulation and report formatting is generally performed at run-time using a variety of meta-data constructs. Metadata within a universal data directory (UDD) 236, for example, can be used to describe any number of forms, reports, workflows, user access privileges, business logic and other constructs that are common to multiple tenants. Tenant-specific formatting, functions and other constructs may be maintained as tenant-specific metadata 238A-B for each tenant, as desired. Rather than forcing data 132 into an inflexible global structure that is common to all tenants and applications, then, database 130 is organized to be relatively amorphous, with tables 234 and metadata 236-238 providing additional structure on an as-needed basis. To that end, application platform 110 suitably uses tables 234 and/or metadata 236, 238 to generate "virtual" components of applications 128A-B to logically obtain, process, and present the relatively amorphous data 132 from database 130.

Application platform 110 is any sort of software application or other data processing engine that generates virtual applications 128A-B that provide data and/or services to client devices 140A-B. Virtual applications 128A-B are typically generated at run-time in response to queries received from client devices 140A-B. In the example illustrated in FIG. 2, application platform 110 includes a bulk data processing engine 212, a query generator 214, a search engine 216 that provides text indexing and other search functionality, and a runtime application generator 220. Each of these features may be implemented as a separate process or other module, and many equivalent embodiments could include different and/or additional features, components or other modules as desired.

Runtime application generator 220 dynamically builds and executes virtual applications 128A-B in response to specific requests received from client devices 140A-B. Virtual applications 128A-B created by tenants are typically constructed in accordance with tenant-specific metadata 238, which describes the particular tables, reports, interfaces and/or other features of the particular application. In various embodiments, each virtual application 128A-B generates dynamic web content that can be served to a browser or other client program 142A-B associated with client device 140A-B, as appropriate.

Application generator 220 suitably interacts with query generator 214 to efficiently obtain multi-tenant data 132 from database 130 as needed. In a typical embodiment, query generator 214 considers the identity of the user requesting a particular function, and then builds and executes queries to database 130 using system-wide metadata 236, tenant specific metadata 238, pivot tables 234 and/or any other available resources. Query generator 214 in this example therefore maintains security of the multi-tenant database 130 by ensuring that queries are consistent with access privileges granted to the user that initiated the request.

Data processing engine 212 performs bulk processing operations on data 132 such as uploads or downloads, updates, online transaction processing and/or the like. In many embodiments, less urgent bulk processing of data 132 can be scheduled to occur as processing resources become available, thereby giving priority to more urgent data processing by query generator 214, search engine 216, virtual applications 128A-B and/or the like. Again, the various components, modules and inter-relationships of other application platforms may vary from the particular examples described herein.

In operation, then, developers use application platform 110 to create data-driven virtual applications 128A-B for the tenants that they support. Such applications 128A-B may make use of interface features such as tenant-specific screens 224, universal screens 222 or the like. Any number of tenant-specific and/or universal objects 226 may also be available for integration into tenant-developed applications 128A-B. Data 132 associated with each application 128A-B is provided to database 130, as appropriate, and stored until requested, along with metadata 138 that describes the particular features (e.g., reports, tables, functions, etc.) of tenant-specific application 128A-B until needed.

Data and services provided by server 102 can be retrieved using any sort of personal computer, mobile telephone, tablet or other network-enabled client device 140 on network 145. Typically, the user operates a conventional browser or other client program 242 to contact server 102 via network 145 using, for example, the hypertext transport protocol (HTTP) or the like. The user typically authenticates his or her identity to the server 102 to obtain a session identification ("SID") that identifies the user in subsequent communications with server 102. When the identified user requests access to a virtual application 128A-B, application generator 220 suitably creates the application at run time based upon metadata 236 and 238, as appropriate. Query generator 214 suitably obtains the requested data 132 from database 130 as needed to populate the tables, reports or other features of virtual application 128A-B. As noted above, the virtual application 128A-B may contain Java, ActiveX or other content that can be presented using conventional client software 142A-B running on client device 140A-B; other embodiments may simply provide dynamic web or other content that can be presented and viewed by the user, as desired.

Figure 3:
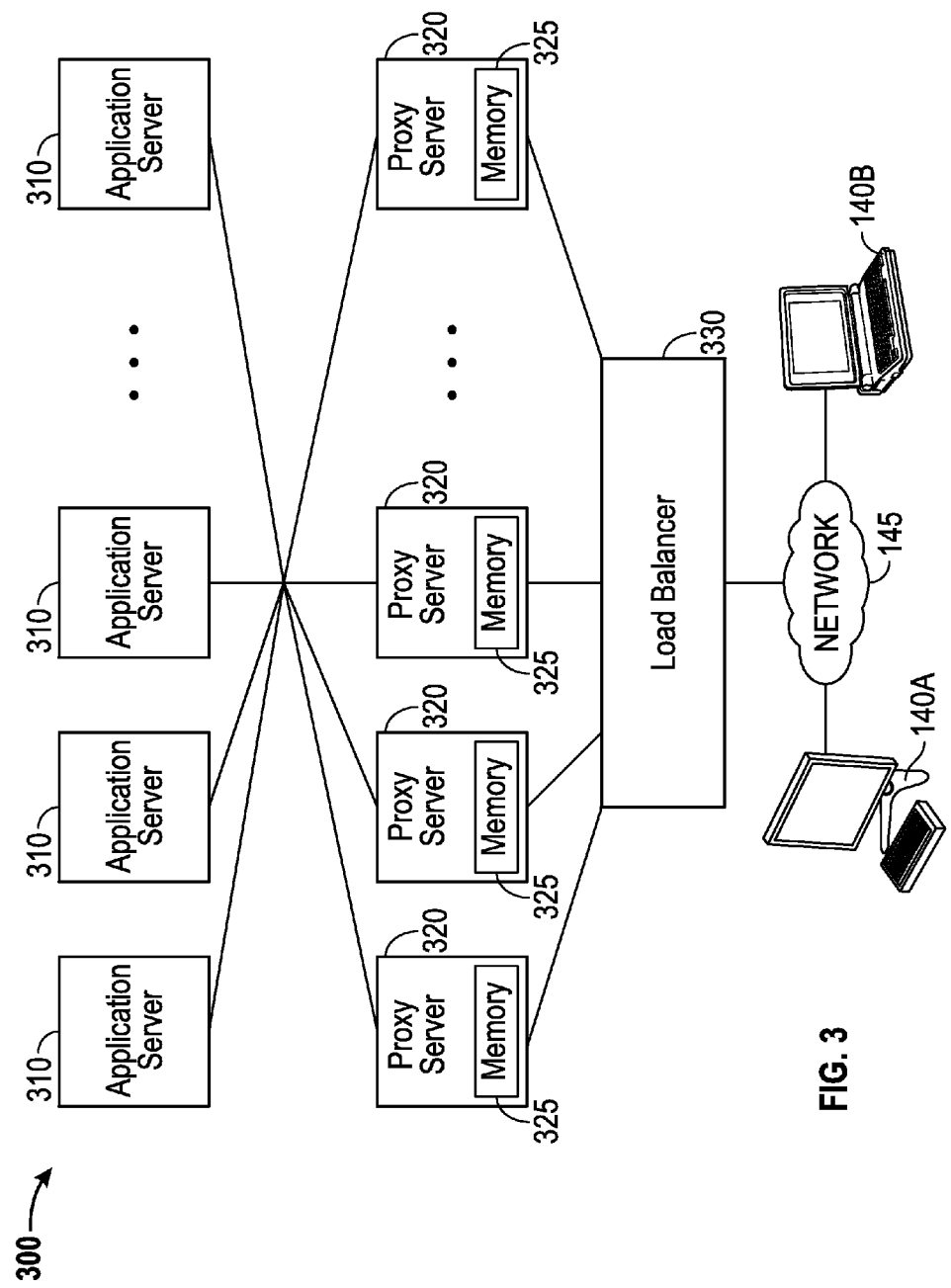
FIG. 3 is a block diagram of an exemplary multi-tenant application system, in accordance with an embodiment.

FIG. 3 is a block diagram of an exemplary multi-tenant application system 300, in accordance with an embodiment. The multi-tenant application system 300 includes at least one application servers 310. Each of the application servers 310 may have access to all of the data in the multi-tenant application system 300, for example, the data 132 stored in the multi-tenant database 130 and all of the data for each of the tenant application 128A-B, or a subset of all of the data in the multi-tenant application system 300. Each of the application servers 310 are communicatively coupled to each of a series of proxy servers 320. The proxy servers 320 act as an intermediary for requests received from clients 140A-B for resources on the application servers 310. In some instances, a proxy server 320 may have the requested resource stored in a memory 325 on the respective proxy server 320. In this instance, the proxy server 320 can transmit the requested resource to the respective client device 140A-B. When the respective proxy server 320 does not have the requested resource, the proxy server 320 requests the resource from one of the application servers 310 and then communicates the requested resource to the respective client device 140A-B. The proxy server 320 may also store the requested resource in the memory 325 such that subsequent requests for the resource can be handled without having to make a request to one of the application servers 310. Accordingly, when a requested resource is stored on the proxy server 320, the proxy server 320 can handle the request without using any of the resources of the application servers 310, reducing the load on the application servers 320. In one embodiment, for example, each of the proxy servers 320 may be communicatively coupled to a load balancer 330. The load balancer 330 may initially receive the request from a client device 140A-B a determine which of the proxy servers 320 to send the request to. The load balancer 330 distributes requests amongst the proxy servers 320 to optimize resource utilization, maximize throughput, minimize response time, and avoid overload.

Because each of the proxy servers 320 handle different requests, the resources stored in the memory 325 of each of the proxy servers may differ. Furthermore, in some instances a resource may be updated on the application servers. However, the previous version of the resource may be stored in cache on one or more of the proxy servers 320. Accordingly, unless the resource is purged from the proxy server, the proxy server may send an old version of the resource in response to a request. In traditional systems, an administrator would have to separately log into each proxy server to purge a resource or to collect statistics or other usage information specific to each proxy server. However, as discussed above, at least one of the application servers 310 includes a proxy management system 150.

Figure 4:
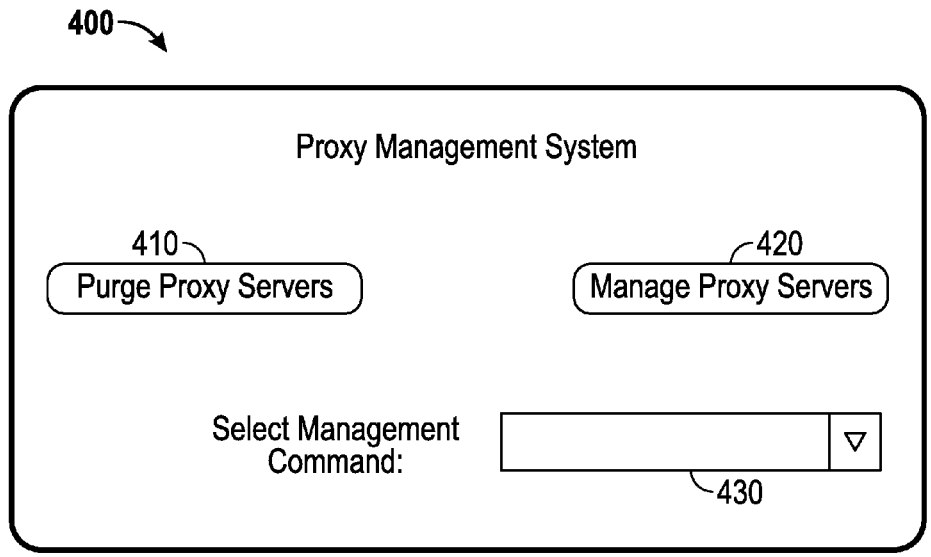
FIG. 4 illustrates an exemplary interface for a proxy management system, in accordance with an embodiment.

FIG. 4 illustrates an exemplary interface 400 for the proxy management system 150. The interface 400 can be accessed by authorized users (authorized by any type of authentication system) and allows the authorized user to contemporaneously purge resources from the proxy servers and collect statistics and other usage data from the proxy servers. In one embodiment, for example, the interface 400 may be a web browser based graphical user interface (GUI). The interface 400 includes a purging interface element 410 and a management interface element 420. The purging interface element 410 allows an authorized user to purge resources stored in the proxy servers. An application server could determine whether a user has authorization to access the proxy management interface 400 via any type of security system. The management interface element 420 allows a user to collect usage statistics and manage certain features of the proxy servers. In one embodiment, for example, the interface 400 may include a command selection interface element 430. The command selection interface element 430 may allow a user to enter or select a command to send to the proxy servers, as discussed in further detail below. One of ordinary skill in the art would recognize that there are many ways to present the interface 400 to a user while maintaining the same or similar functionality.

Figure 5:
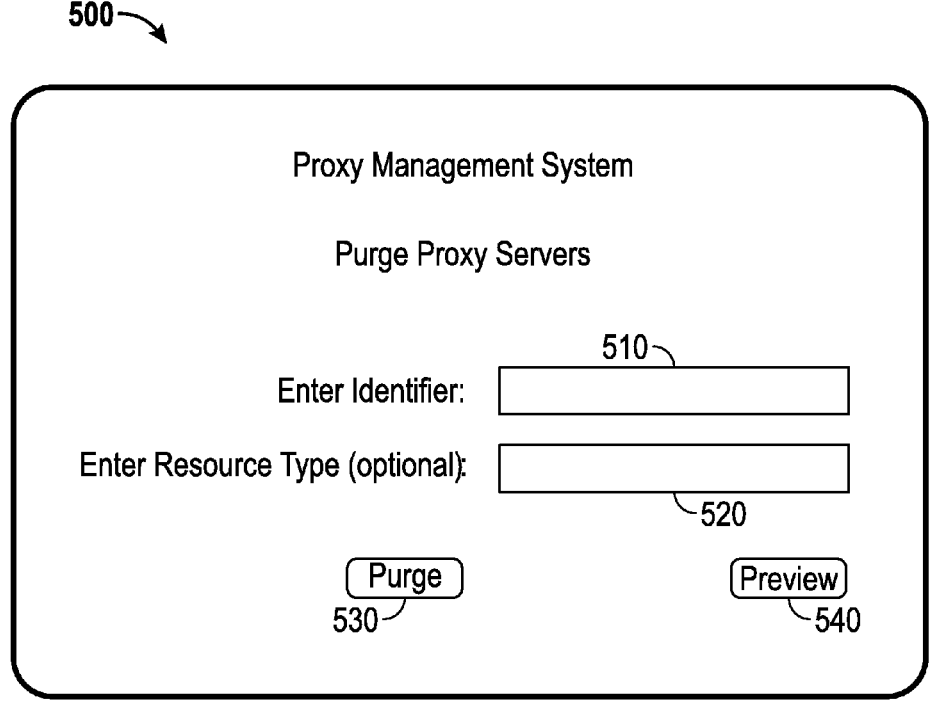
FIG. 5 illustrates an exemplary purging interface, in accordance with an embodiment.

FIG. 5 illustrates an exemplary purging interface 500, in accordance with an embodiment. The purging interface 500 allows a user to enter an identifier associated with a resource in an identifier interface 510. In one embodiment, for example, the resources may be identified by a uniform resource locator (URL). Resources may also be identified by an ETag or a combination of an ETag and a URL. The identifier interface 510 may accept entire identifiers, such as a complete URL, or a user may search using a partial identifier. For example, a user can search for one or more resources that starts, contains, or ends with a certain partial identifier. In some instances, multiple file types may be associated with a particular resource. The file types may include, but are not limited to a hypertext markup language (HTML) file, a graphics interchange format (GIF) file, a joint photographic experts group (JPEG) file, a portable network graphics (PNG) file, or a file in any other image format, a cascading style sheets (CSS) file, a JavaScript file, or the like. Accordingly, the purging interface 500 may also include a file type interface 520 which allows a user to optionally select or enter a certain file type to search for. The purging interface 500 then either allows a user to immediately send out the purge command to all of the proxy servers via a purge interface 530 or to send a command to all of the proxy servers to return a list of any resource matching the identifier or partial identifier via a preview interface 540. By sending the commands to all of the proxy servers at the same time, the purging interface greatly increases the efficiency of managing the proxy servers.

Figure 6:
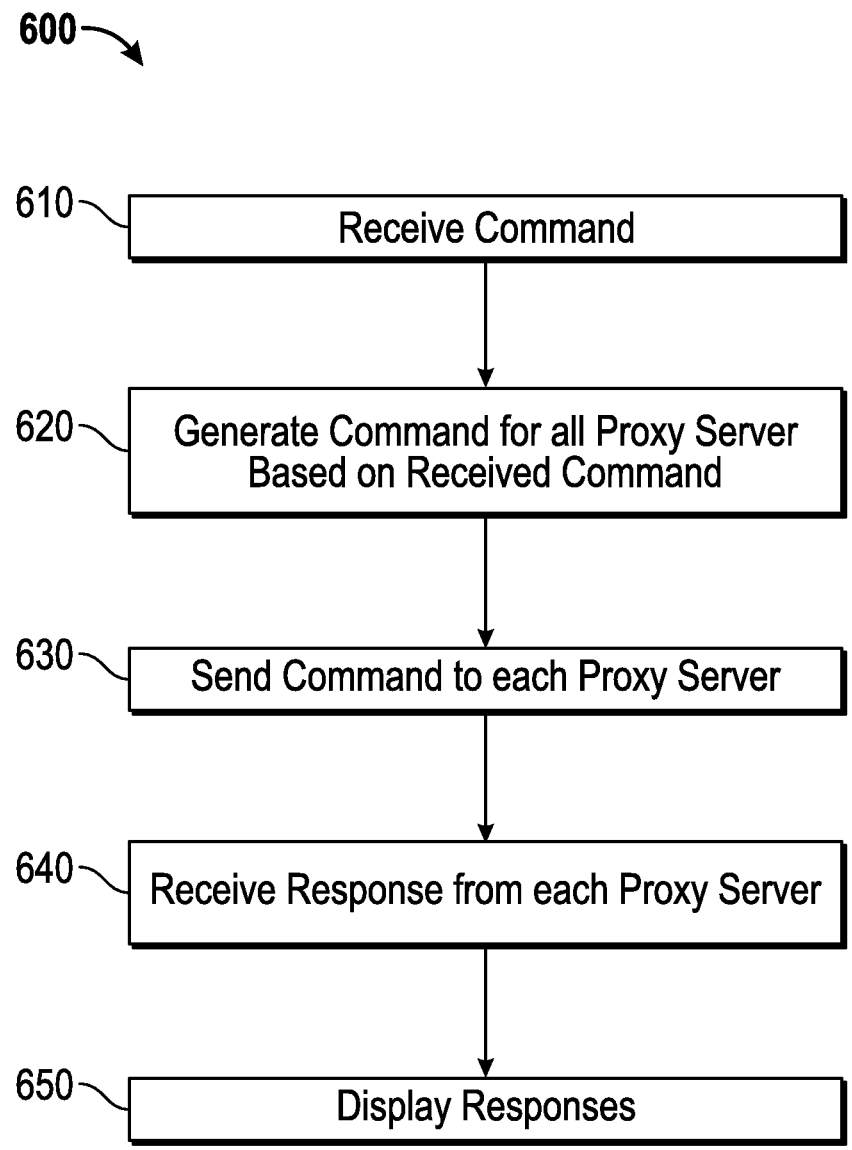
FIG. 6 is a flow chart illustrating a method for sending a command to each proxy server in a system, in accordance with an embodiment.

FIG. 6 is a flow chart illustrating a method 600 for sending a command to each proxy server in a system, in accordance with an embodiment. The method 600 can be executed by a processor in an application server, such as the processor 105 illustrated in FIG. 1. In one embodiment, for example, the processor may execute a non-transitory computer-readable medium storing instructions for executing the proxy management system. The method 600 begins when the processor receives a command to be sent to each of the proxy servers. (Step 610). The command can be a command to purge contents of a cache where previously retrieved resources are stored or to return a list of resources that match an identifier. The command can also be a command to perform other management functions or to return performance statistics for the respective proxy server. Table 1 below is an exemplary list of commands and a brief description of commands that could be sent to the proxy servers.

TABLE 1

| Short name | Description |
| --- | --- |
| leaks | Memory Leak Tracking |
| mem | Memory Utilization |
| cbdata | Callback Data Registry Contents |
| events | Event Queue |
| squidaio_counts | Async IO Function Counters |
| diskd | DISKD Stats |
| config | Current Squid Configuration* |
| comm_incoming | comm_incoming( ) Stats |
| ipcache | IP Cache Stats and Contents |
| fqdncache | FQDN Cache Stats and Contents |
| idns | Internal DNS Statistics |
| dns | Dnsserver Statistics |
| redirector | URL Redirector Stats |
| basicauthenticator | Basic User Authenticator Stats |
| digestauthenticator | Digest User Authenticator Stats |
| ntlmauthenticator | NTLM User Authenticator Stats |
| external_acl | External ACL Stats |
| http_headers | HTTP Header Statistics |
| via_headers | Via Request Headers |
| forw_headers | X-Forwarded-For Request Headers |
| menu | This Cache Manager Menu |
| shutdown | Shut Down the Squid Process* |
| offline_toggle | Toggle offline_mode Setting* |
| info | General Runtime Information |
| filedescriptors | Process File Descriptor Allocation |
| objects | All Cache Objects |
| vm_objects | In-Memory and In-Transit Objects |
| openfd_objects | Objects with Swapout Files Open |
| io | Server-Side Network read( ) Size Histograms |
| counters | Traffic and Resource Counters |
| peer_select | Peer Selection Algorithms |
| digest_stats | Cache Digest and ICP Blob |
| 5 min | 5 Minute Average of Counters |
| 60 min | 60 Minute Average of Counters |
| utilization | Cache Utilization |
| histograms | Full Histogram Counts |
| active_requests | Client-Side Active Requests |
| store_digest | Store Digest |
| storedir | Store Directory Stats |
| store_check_cachable_stats | storeCheckCachable( ) Stats |
| store_io | Store IO Interface Stats |
| pconn | Persistent Connection Utilization Histograms |
| refresh | Refresh Algorithm Statistics |
| delay | Delay Pool Levels |
| forward | Request Forwarding Statistics |
| client_list | Cache Client List |
| netdb | Network Measurement Database |
| asndb | AS Number Database |
| carp | CARP Information |
| server_list | Peer Cache Statistics |
| non_peers | List of Unknown Sites Sending ICP Messages |

Figure 7:
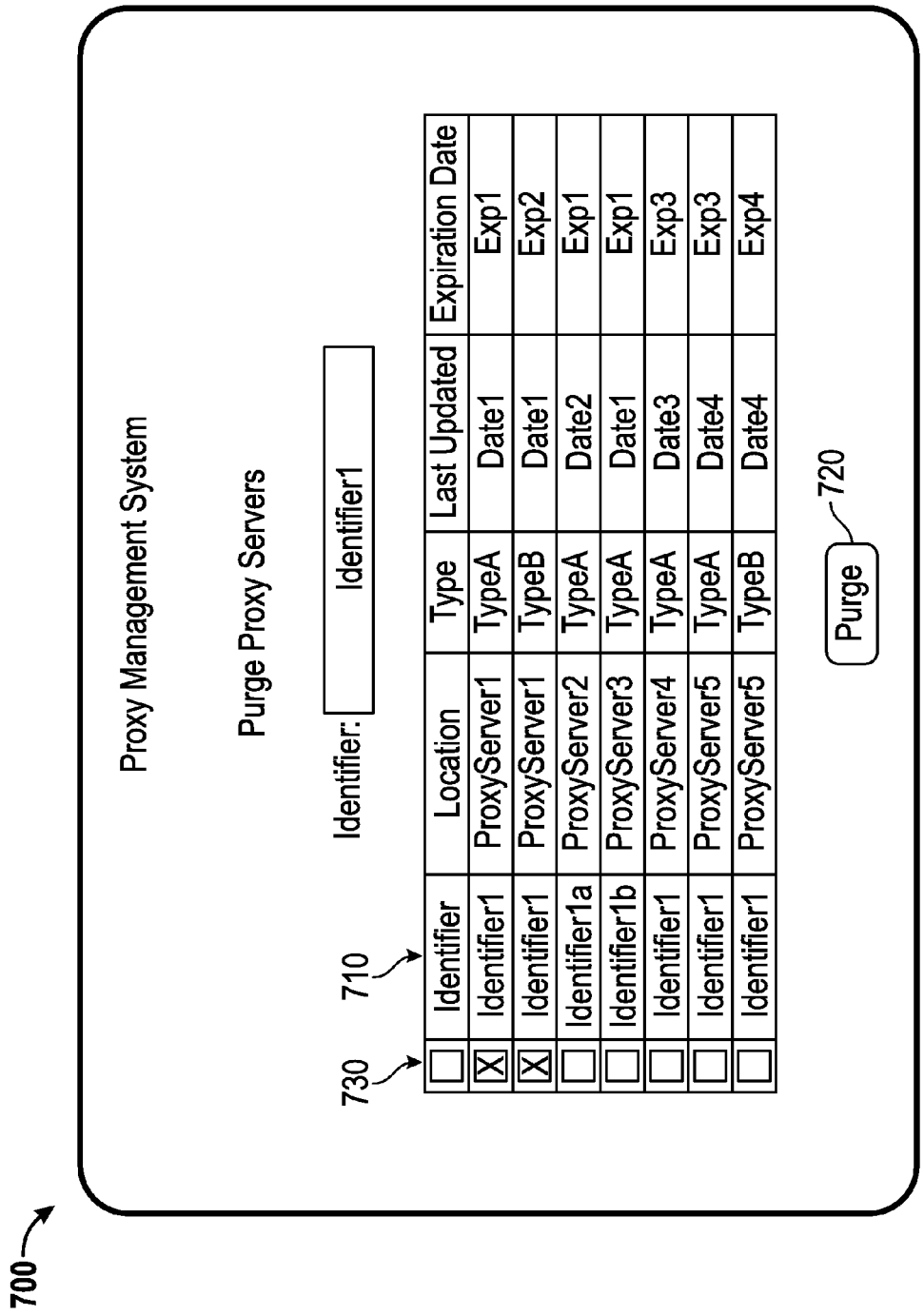
FIG. 7 is an illustration of a purge preview interface, in accordance with an embodiment.

The processor then generates a command for each of the proxy servers based upon the received command. (Step 620). In one embodiment, for example, a unique address for each proxy server may be stored in a memory of the application server. Accordingly, the processor may create a command for each proxy server and address the command based upon the address of each proxy server stored in the memory. The created commands may be identical for each proxy server, for example, as command to return certain statistics and/or customized for each server. In one embodiment, for example, the commands may be customized for each server to purge certain resources stored on the respective proxy server, as illustrated in FIG. 7 and discussed in further detail below. The processor then transmits the commands to each of the proxy servers. (Step 630). In one embodiment, for example, the processor may utilize a thread pool executer to send the commands to the proxy servers such as the ThreadPoolExecutor of the Java programming language. In other embodiments, for example, a smart thread pool, such as the SmartThreadPool open source tool, may be utilized by the processor to manage the threads. In yet other embodiments, for example, a thread pool exector such as the Python ThreadPoolExector, may be utilized by the processor to manage the threads. The processor can submit tasks to the thread pool executor. In this instance, the tasks are commands that need to be transmitted to the proxy servers in the system. Multiple tasks can be executed simultaneously by the thread pool executor, however the thread pool executor tracks and manages each task separately. In one embodiment, for example, the commands will be sent by the thread pool executor to the proxy servers one at a time. However, the thread pool executor does not have to wait for a task to be complete before beginning the execution the next task since the thread pool executor tracks and manages each task separately. Accordingly, the thread pool executor parallelizes the tasks as each separate proxy server can process its own task independent of the other proxy servers in the system.

The processor then collects the responses from the proxy servers. (Step 640). The response will vary depending upon the task. If the command was to purge a resource from the cache in each proxy server, the response may be a confirmation. If the command was the objects command, the response returns a list of all of the cached entries. The processor then organizes all of the data returned by the various proxy servers and displays the collected data to the user. (Step 650).

FIG. 7 is an illustration of a purge preview interface 700, in accordance with an embodiment. As discussed above, the purge preview interface 700 may be created after the user interacts with the preview interface 540 and after the processor executes the method illustrated in FIG. 6. As seen in FIG. 7, the purge preview interface 700 includes a list 710 of the resources stored on the proxy servers in the system which match or partially match the identifier Identifier1. The user is then given the option of purging all of the resources of a subset of the resources via a purge interface 720. In one embodiment, for example, the purge preview interface 700 may further include a selection interface 730 allowing a user to select which of the retrieved resources to purge. Once the user interacts with the purge interface 720, the processor sends the purge commands via the method discussed in FIG. 6

Accordingly, the proxy management system discussed herein allows a user to manage multiple proxy server simultaneously, increasing the speed and efficiency of managing a system of proxy servers. While the system described herein describes a proxy management system in a multi-tenant database system, the proxy management system may be utilized in any other computer system configuration where multiple proxy servers are used.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method for managing a plurality of proxy servers in a multi-tenant application system, comprising:
   receiving, by a processor, a first command;
   generating, by the processor, a customized second command for each of the plurality of proxy servers based upon the first command; and
   transmitting each of the generated second commands to the respective proxy server.

2. The method of claim 1, wherein the first command is a purge command including an identifier of a resource.

3. The method of claim 1, wherein the first command is a purge preview command including an identifier of a resource.

4. The method of claim 3, further comprising:
   receiving, by the processor, a list of resources matching the identifier;
   generating, by the processor, a purge command to purge at least a subset of the resources in the received list of resources; and
   transmitting the command to purge the at least subset of the resources in the list of resources to the respective proxy server.

5. The method of claim 1, further comprising:
   tracking, by the processor, an execution of each of the second commands.

6. The method of claim 5, wherein the processor is configured to utilize a thread pool executor to track the execution of each of the second commands.

7. The method of claim 1, wherein the first command is a command requesting usage statistics.

8. The method of claim 1, further comprising:
   receiving, by the processor, a response to each of the second commands from the plurality of proxy servers;
   organizing, by the processor, data from the response from the at least some of the plurality of proxy servers; and
   displaying, by the processor, the organized data on a display device.

9. An application server in a multi-tenant application system, comprising:
   a memory configured to store addresses for each a plurality of proxy servers communicatively coupled to the application server; and
   a processor communicatively coupled to the memory, wherein the processor is configured to:
      receive a first command,
      generate a customized second command for each of the plurality of proxy servers communicatively coupled to the application server based upon the address of the plurality of proxy servers stored in the memory and based upon the first command, and
      transmit each of the generated second commands to the respective proxy server.

10. The application server of claim 9, wherein the processor is further configured to track an execution of each of the transmitted second commands via a thread pool executor.

11. The application server of claim 9, wherein the first command is a purge command including an identifier of a resource.

12. The application server of claim 9, wherein the first command is a purge preview command including an identifier of a resource.

13. The application server of claim 12, wherein the processor is further configured to:
   receiving a list of resources matching the identifier;
   generating a purge command to purge at least a subset of the resources in the received list of resources; and
   transmitting the command to purge the at least subset of the resources in the list of resources to the respective proxy server.

14. The application server of claim 9, wherein the first command is a command requesting usage statistics.

15. The application server of claim 9, wherein the processor is further configured to:
   receive a response from at least some of the plurality of proxy servers;
   organize data from the response from the at least some of the plurality of proxy servers; and
   display the organized data on a display device.

16. A computer-readable medium storing instructions, which when executed by a processor in an application server in a multi-tenant application system, cause the processor to:
   receive a first command;
   generate a customized second command for each of a plurality of proxy servers communicatively coupled to the application server based upon an address of the plurality of proxy servers stored in a memory and based upon the first command; and
   transmit each of the generated second commands to the respective proxy server.

17. The non-transitory computer-readable medium of claim 16 which when executed by the processor, further cause the processor to track an execution of each of the transmitted second commands via a thread pool executor.

18. The non-transitory computer-readable medium of claim 16, wherein the first command is a purge command including an identifier of a resource.

19. The non-transitory computer-readable medium of claim 18 which when executed by the processor, further cause the processor to:
   receive a list of resources matching the identifier;
   generate a purge command to purge at least subset of the resources in the received list of resources; and
   transmit the command to purge the at least a subset of the resources in the list of resources to the respective proxy server.

20. The non-transitory computer-readable medium of claim 16 which when executed by the processor, further cause the processor to:
   receive a response from at least some of the plurality of proxy servers;
   organize data from the response from the at least some of the plurality of proxy servers; and
   display the organized data on a display device.

* * * * *